(12) United States Patent
Ishikawa

(10) Patent No.: US 11,037,370 B2
(45) Date of Patent: Jun. 15, 2021

(54) INFORMATION PROCESSING APPARATUS, AND INFORMATION PROCESSING METHOD AND PROGRAM THEREFOR

(71) Applicant: SONY CORPORATION, Tokyo (JP)

(72) Inventor: Tsuyoshi Ishikawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/478,272

(22) PCT Filed: Dec. 20, 2017

(86) PCT No.: PCT/JP2017/045619
§ 371 (c)(1),
(2) Date: Jul. 16, 2019

(87) PCT Pub. No.: WO2018/139117
PCT Pub. Date: Aug. 2, 2018

(65) Prior Publication Data
US 2020/0134921 A1 Apr. 30, 2020

(30) Foreign Application Priority Data
Jan. 27, 2017 (JP) .............................. JP2017-013494

(51) Int. Cl.
| | | |
|---|---|---|
| *G06T 19/00* | (2011.01) | |
| *G06F 16/687* | (2019.01) | |
| *G06F 16/683* | (2019.01) | |
| *G06K 9/00* | (2006.01) | |
| *G06K 9/62* | (2006.01) | |
| *G06T 19/20* | (2011.01) | |

(52) U.S. Cl.
CPC .......... *G06T 19/006* (2013.01); *G06F 16/683* (2019.01); *G06F 16/687* (2019.01); *G06K 9/00671* (2013.01); *G06K 9/6202* (2013.01); *G06T 19/20* (2013.01)

(58) Field of Classification Search
None
See application file for complete search history.

(56) References Cited

U.S. PATENT DOCUMENTS

2016/0148624 A1* 5/2016 Jonan ...................... G10L 21/10
381/92

FOREIGN PATENT DOCUMENTS

| JP | 2000-270203 A | 9/2000 | |
|---|---|---|---|
| JP | 2004-271901 A | 9/2004 | |
| JP | 2010-237516 | * 10/2010 | ............... G09G 5/00 |

OTHER PUBLICATIONS

Nitta et al. ("Machine Translation" of JP2010-237516). (Year: 2010).*

* cited by examiner

*Primary Examiner* — Peter Hoang
(74) *Attorney, Agent, or Firm* — Paratus Law Group, PLLC

(57) ABSTRACT

There is provided an information processing apparatus, and an information processing method and a program therefor, which can achieve an increase in interest of a user. The information processing apparatus includes a recognition unit and a processing unit. The recognition unit is configured to recognize an object in a real space. The processing unit is configured to perform visual effect processing on a target object image in accordance with a feature amount of music, the target object image being an image of the object recognized by the recognition unit.

16 Claims, 8 Drawing Sheets

INFORMATION PROCESSING APPARATUS, AND INFORMATION PROCESSING METHOD AND PROGRAM THEREFOR

CROSS REFERENCE TO PRIOR APPLICATION

This application is a National Stage Patent Application of PCT International Patent Application No. PCT/JP2017/045619 (filed on Dec. 20, 2017) under 35 U.S.C. § 371, which claims priority to Japanese Patent Application No. 2017-013494 (filed on Jan. 27, 2017), which are all hereby incorporated by reference in their entirety.

TECHNICAL FIELD

The present technology relates to an information processing apparatus that mainly uses AR (Augmented Reality), and to a method and a program therefor.

BACKGROUND ART

The image processing apparatus described in Patent Literature 1 acquires an input image in which the real world appears, and performs predetermined processing on the input image. For example, the image processing apparatus processes a partial image within the input image, the partial image corresponding to an object specified by a search or the like by a user among objects included in a three-dimensional model and existing in the real world (within the input image), and generates an emphasized image (paragraphs [0044] and [0058] in the specification).

Patent Literature 2 discloses that there is an application that, when music captured in a personal computer or the like is reproduced, causes a monitor to display an image suited to the music to be reproduced along with the reproduction (see paragraph [0002] in the specification). Further, the reproduction control apparatus described in Patent Literature 2 acquires image data having the same time cord as that added to sound data indicated be reproduced, and causes a speaker to output the sound data. The reproduction control apparatus then applies an effect suited to a sound pattern of the sound data on the acquired image data, and causes a display to display the resultant image data (see paragraph [0023] in the specification).

CITATION LIST

Patent Literature

Patent Literature 1: Japanese Patent Application Laid-open No. 2012-79129
Patent Literature 2: Japanese Patent Application Laid-open No. 2007-35121

DISCLOSURE OF INVENTION

Technical Problem

In recent years, various devices and systems using the AR technology have been developed, but there is a demand for efforts and improvements by which users can further get pleasure.

It is an object of the present disclosure to provide an information processing apparatus, and an information processing method and a program therefor, which can achieve an increase in interest of a user.

Solution to Problem

In order to achieve the object described above, an information processing apparatus according to one embodiment includes a recognition unit and a processing unit.

The recognition unit is configured to recognize an object in a real space.

The processing unit is configured to perform visual effect processing on a target object image in accordance with a feature amount of music, the target object image being an image of the object recognized by the recognition unit.

Thus, a user can view and enjoy images in which the object in the real space is displayed in synchronization with music, and it is possible to achieve an increase in interest of the user.

The processing unit may be configured to perform visual effect processing associated with a type of the object.

The processing unit may be configured to acquire a frequency band of the music as the feature amount, assign a plurality of target object images corresponding to a plurality of objects for each of the frequency bands, and perform the visual effect processing on the plurality of target object images. Thus, the user can feel a visual effect of each of the target object images assigned for each of the frequency bands.

The processing unit may be configured to acquire position information of a sound source of the music as the feature amount, assign a plurality of target object images corresponding to a plurality of objects for each of positions of the sound sources, and perform the visual effect processing on the plurality of target object images. Thus, the user can feel a visual effect of each of the target object images assigned for each of the positions of the sound sources.

The processing unit may be configured to respectively perform different types of visual effect processing on the plurality of target object images. Thus, the user can feel different visual effects for each of the frequency bands or the positions of the sound sources.

The processing unit is configured to acquire information of a tempo of the music as the feature amount, and perform the visual effect processing in accordance with the tempo.

The processing unit may be configured to acquire information of a tone of the music as the feature amount, and perform the visual effect processing in accordance with the tone.

The processing unit may be configured to acquire meta-information attached to data of the music, and perform the visual effect processing on the basis of the meta-information.

The meta-information may include visual effect setting information that is information of setting related to the visual effect processing.

The information processing apparatus may further include a feature amount extraction unit that extracts the feature amount from data of the music. In other words, the information processing apparatus can dynamically extract a feature amount from data of music and perform visual effect processing.

The information processing apparatus may further include a setting unit configured to perform processing of causing a user to set at least one of the feature amount, the object, or content of the visual effect processing.

The information processing apparatus may further include a surrounding-environment-information acquisition unit configured to acquire information of a surrounding environment of the information processing apparatus. The processing unit may be configured to further perform the visual effect processing on the basis of the information of the surrounding environment. Thus, the information processing apparatus can display a visual effect corresponding to the surrounding environment of the information processing apparatus.

The surrounding environment acquisition unit may be configured to acquire, as the information of the surrounding environment, position information of the information processing apparatus, information of a natural environment in which the information processing apparatus is placed, or biological information of a user.

An information processing apparatus according to another embodiment includes the recognition unit described above and a processing unit.

The processing unit is configured to perform visual effect processing on a target object image in accordance with meta-information attached to data of music, the target object image being an image of the object recognized by the recognition unit.

An information processing method according to one embodiment includes recognizing an object in a real space.

Visual effect processing is performed on a target object image in accordance with a feature amount of music, the target object image being an image of the recognized object.

An information processing method according to another embodiment includes realizing an object in a real space.

Visual effect processing is performed on a target object image is accordance with meta-information attached to data of music, the target object image being an image of the recognized object.

A program according to one embodiment causes an information processing apparatus (computer) to perform the information processing method described above.

Advantageous Effects of Invention

Hereinabove, according to the present technology, it is possible to achieve an increase in interest of a user.

It should be noted that the effects described herein are not necessarily limited and may be any one of the effects described in the present disclosure.

MODE(S) FOR CARRYING OUT THE INVENTION

Hereinafter, embodiments according to the present technology will be described with reference to the drawings.

1. Embodiment 1

1.1) Configuration of Information Processing Apparatus

Figure 1:
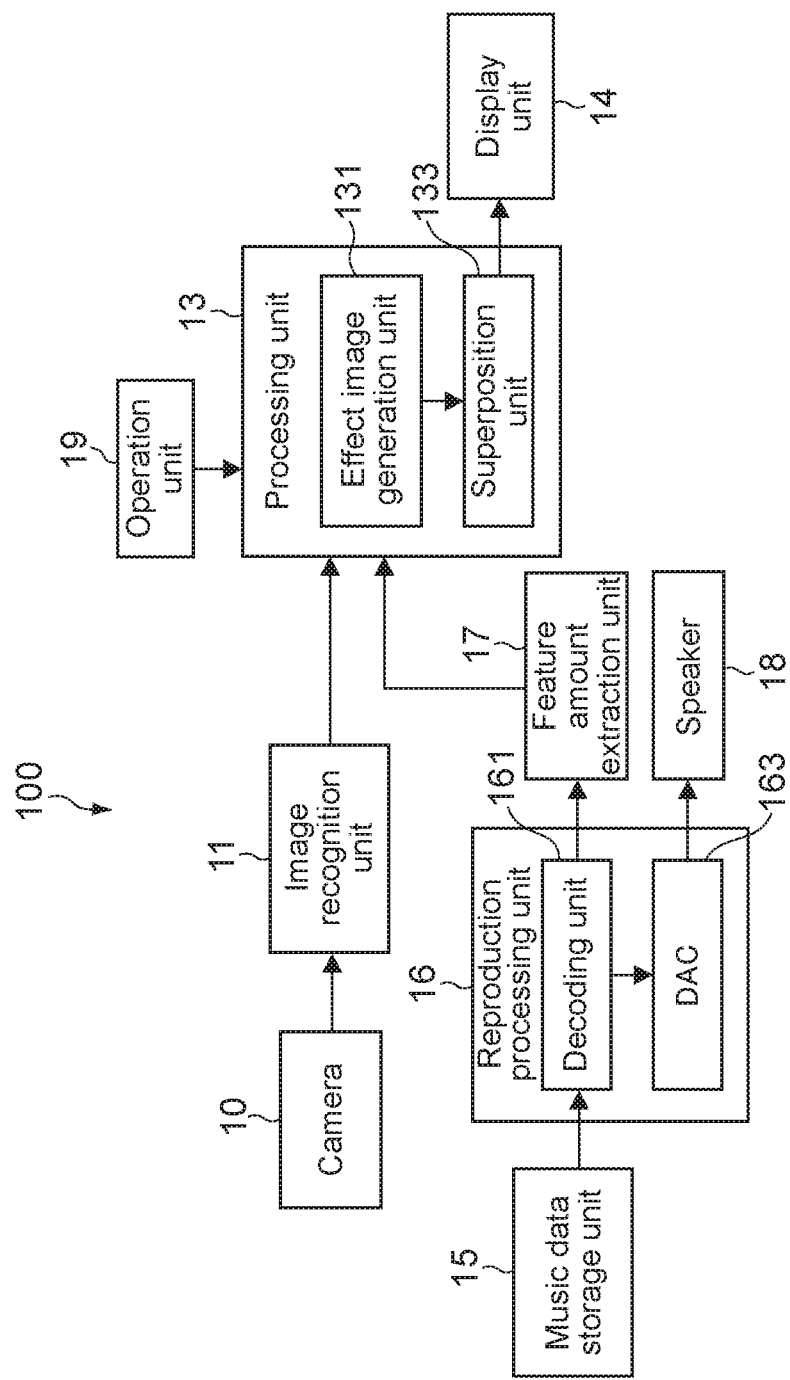
FIG. 1 is a block diagram showing a configuration of an information processing apparatus according to Embodiment 1 of the present technology.

FIG. 1 is a block diagram showing a configuration of an information processing apparatus according to Embodiment 1 of the present technology. The information processing apparatus 100 is, for example, a smartphone, a tablet computer, a head mounted display device, or another portable, wearable, or non-portable computer. Alternatively, the information processing apparatus 100 may be a dedicated device optimized for the present technology.

The information processing apparatus 100 includes, for example, a camera 10, an image recognition unit 11, a music data storage unit 15, a reproduction processing unit 16, a feature amount extraction unit 17, a processing unit 13, a display unit 14, a speaker 18, and an operation unit 19.

The image recognition unit (recognition unit) 11 has functions of analyzing an image captured with the camera 10 in real time or an image captured in the past, i.e., an image in which the real space appears (hereinafter referred to as real space image) and of recognizing an object within the real space. The real space image captured with the camera 10 may be either a still image or a moving image.

By processing and analyzing the real space image by a publicly known algorithm, the image recognition unit 11 identifies and recognizes an object within the real space image. Examples of the publicly known algorithm includes block processing, filtering processing, contrast processing, segmentation, Fourier transform, discrete cosine transform, object analysis, and texture analysis.

Further, the image recognition unit 11 has a function of sorting and identifying the analyzed object by the types of object. The types of object are, for example, construction, bridge, street lamp, light source, vehicle, people, mountain, river, sea, flower, desk, chair, book, pen, cup, and dish, and identifiers (ID) correspond thereto in advance in each of the types of object. Hereinafter, this is referred to as an object ID. The object ID may be stored in advance in a memory (not shown) of the information processing apparatus 100 or may be stored in a server on the cloud accessible by the information processing apparatus 100.

The music data storage unit 15 has a function of storing data of music (song).

The reproduction processing unit 16 has a function of reproducing music data stored in the music data storage unit 15 and outputting it to the speaker 18.

For example, the reproduction processing unit 16 includes a decoding unit 161 and a DAC (DA conversion unit) 163 (not shown). The reproduction processing unit 16 decodes music data, which is encoded in a predetermined codec, by the decoding unit 161, and outputs an analog signal to the speaker 18 via the DAC 163.

Instead of or in addition to the speaker 18, the information processing apparatus 100 may include a sound output terminal. Headphones or earphones are connectable to the sound output terminal.

The feature amount extraction unit 17 has a function extracting a feature amount of the music from the decoded music data. Examples of the feature amount include a frequency band (or signal level in each frequency band), a position of a sound source, a tempo, or a tone (key of major, minor, or the like).

The processing unit 13 has a function of performing visual effect processing on the target object image, which is the image of the object recognized by the image recognition unit 11, in accordance with the feature amount of the music extracted by the feature amount extraction unit 17. The processing unit 13 includes, for example, an effect image generation unit 131 and a superposition unit 133.

The effect image generation unit 131 generates an effect image for the visual effect processing on the basis of (the object ID corresponding to) the target object image recognized by the image recognition unit 11. The effect image may be either a still image or a moving image.

The superposition unit 133 superposes the effect image generated by the effect image generation unit 131 on the real space image and generates a composite image obtained thereby. For example, the type of the recognized object ID and that of the effect image only need to be associated with each other in advance.

Alternatively, the information processing apparatus 100 may download a table showing the association of the type of the above-mentioned object ID and that of the effect image from a server on the cloud.

The use of the object ID is not an indispensable element. In this case, the effect image generation unit 131 can generate an effect image by a publicly known AR algorithm on the basis of the form (shape, size, color, or the like) of the target object image (object).

The display unit 14 displays the composite image generated by the processing unit 13. The operation unit 19 has a function of receiving operation information by the user. The operation unit 19 may be integrated with the display unit 14 like a touch panel, or may be provided separately from the display unit 14.

The information processing apparatus 100 includes hardware (not shown) including a CPU (Central Processing Unit), a RAM (Random Access Memory), a ROM (Read Only Memory), and the like. The information processing apparatus 100 may include other hardware including a PLD (Programmable Logic Device) such as an FPGA (Field Programmable Gate Array), a DSP (Digital Signal Processor), a GPU (Graphics Processing Unit), and the like. By cooperation of the hardware and software stored in the memory, each function of the information processing apparatus 100 is achieved.

1.2) Operation of Information Processing Apparatus

Figure 2:
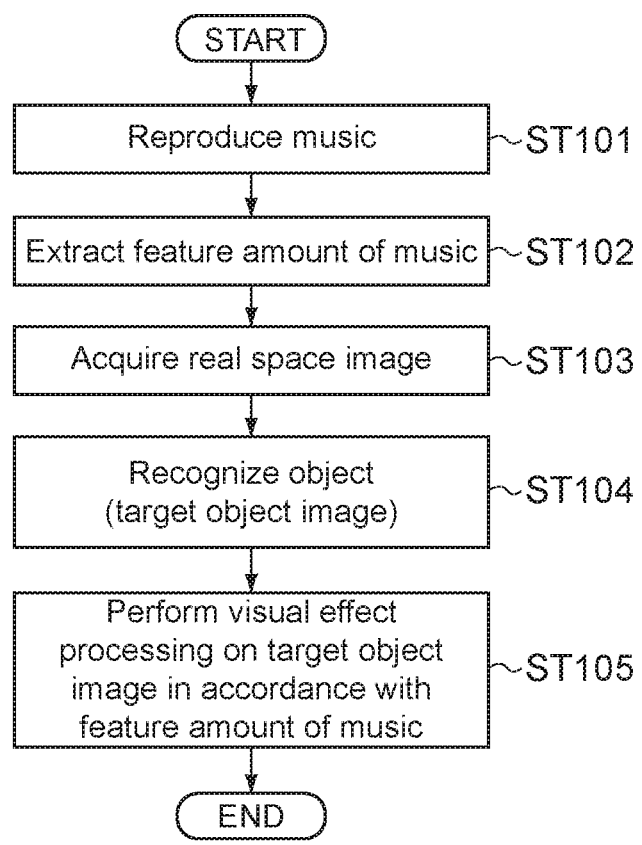
FIG. 2 is a flowchart showing an operation of the information processing apparatus shown in FIG. 1.

FIG. 2 a flowchart showing an operation of the information processing apparatus 100. For example, by an operation of a user, music data is selected from the music data storage unit 15 and reproduced by the reproduction processing unit 16 (Step 101). A feature amount of the music is extracted by the feature amount extraction unit 17 (Step 102). When a real space image is acquired (or acquisition thereof is started) by imaging (or the start of imaging) of the camera 10 (Step 103), an object within the real space image is recognized by the image recognition unit 11 (Step 104). The image of the object is assumed as a target object image that is to be a target of visual effect processing.

The order of Steps 101 to 102 and Steps 103 and 104 may be inverse or simultaneous. In other words, Step 103 may be performed first and Step 101 may be performed later, or Step 103 and Step 101 may be performed simultaneously.

The processing unit 13 generates an effect image in accordance with the extracted feature amount, superposes the generated effect image on the real space image including the target object image to generate a composite image, and displays the composite image (Step 105).

For example, when there is a plurality of target object images as will be described later, the processing unit 13 assigns the plurality of target object images for each of the values of the feature amount, and executes visual effect processing on the plurality of target object images.

It should be noted that in this Embodiment 1, the feature amount extraction unit 17 typically extracts the feature amount of the music data in real time during reproduction thereof. The information processing apparatus 100 may have a function of saving the feature amount, which is temporarily extracted, of the music data in storage. Thus, when the music data is reproduced for the second time or later, extraction processing for the feature amount can be omitted.

1.3) Example of Composite Image by Visual Effect Processing 1.3.1) Example 1

Figure 3:
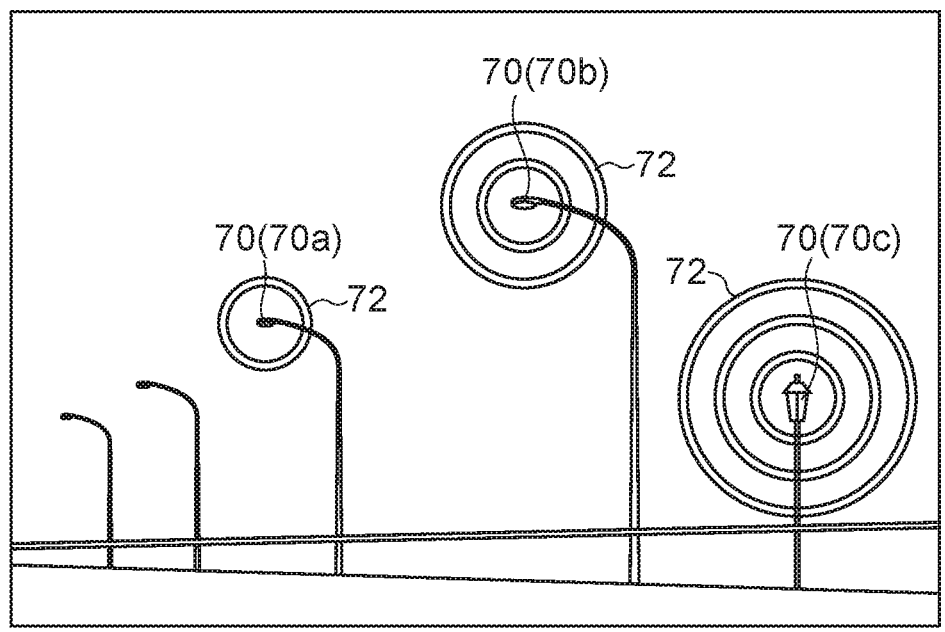
FIG. 3 shows Example 1 of a composite image by visual effect processing in Embodiment 1.

FIG. 3 shows Example 1 of a composite image by the visual effect processing. A real space image according to Example 1 is of a landscape of a road at night. The feature amount of music is, for example, a signal level for each frequency band. The image recognition unit 11 recognizes an image of a street lamp or illumination (or light source 70 with predetermined area or larger) as the target object image. The processing unit 13 superposes rings 72, as effect images, around the light sources 70 in accordance with the frequency bands of music being reproduced. In other words, the processing unit 13 assigns a plurality of different light sources (target object images) 70a, 70b, and 70c for each of the frequency bands and performs the visual effect processing on the plurality of target object images.

In Example 1, for example, when the area of the light source is small (equal to or smaller than a first threshold), an image of one ring 72 is generated as an effect image corresponding to a high-pitch range (first frequency band) (see the light source 70a). When the area of the light source is medium (exceeds the first threshold and is equal to or smaller than a second threshold larger than the first threshold), an image of two rings 72 is generated as an effect image corresponding to a mid-pitch range (second frequency band) (see the light source 70b). When the area of the light source is large (exceeds the second threshold), an image of three rings 72 is generated as an effect image corresponding to a low-pitch range (third frequency band) (see the light source 70c).

The effect images using those rings 72 include, for example, animation images in which one ring 72 around the light source of the high-pitch range blinks, or a plurality of concentric rings 72 of the low-pitch range and mid-pitch range is turned on from the inner side in sequence.

Alternatively, an effect image in which the number, size, color density, or the like of the rings 72 changes depending on a signal level of each frequency band may be generated. When the target object image is of a street lamp or a light source, the effect image is not limited to the ring and may be a filled circle or other forms.

Instead of or in addition to the area of the light source, the image recognition unit 11 may use luminance or brightness of the light source as a recognition reference of the light source of the target object image.

As described above, the information processing apparatus 100 can present a composite image to the user, the composite image including a rhythmic effect image synchronized with the music that the user is currently listening. The user can get pleasure by viewing that composite image, and it is possible to achieve an increase in interest of a user.

Further, the information processing apparatus 100 includes the feature amount extraction unit 17, and can thus dynamically extract the feature amount from the data of the reproduced music to perform the visual effect processing.

Further, the user can feel a visual effect of the target object images assigned for each of the frequency bands as the feature amount.

1.3.2) Example 2

Figure 4:
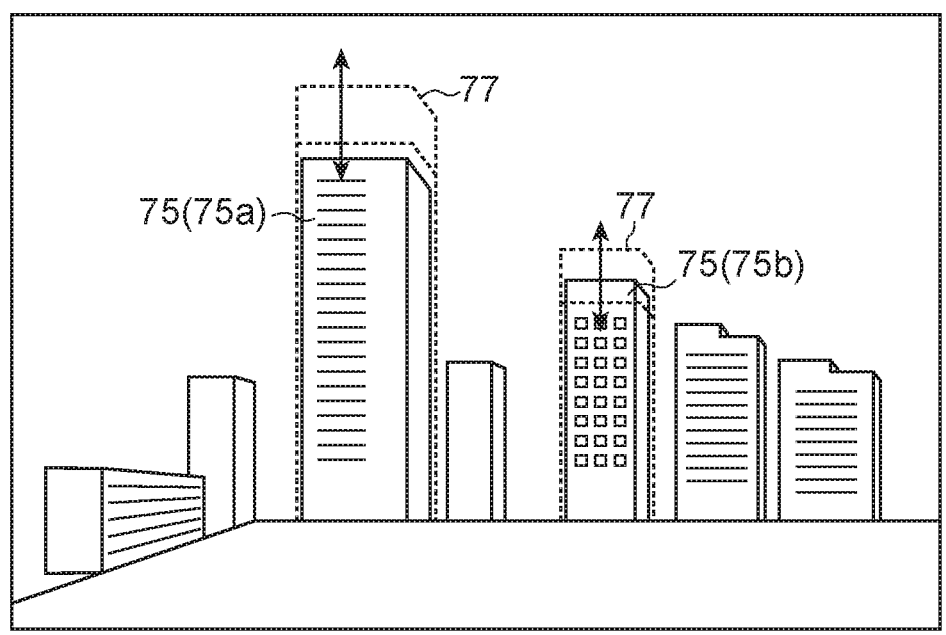
FIG. 4 shows Example 2 of a composite image by visual effect processing in Embodiment 1.

FIG. 4 shows Example 2 of a composite image by the visual effect processing. A real space image according to Example 2 is of a landscape of a group of buildings. The feature amount of music is, for example, a signal level for each frequency band. The image recognition unit 11 recognizes a construction 75. The processing unit 13 superposes, as an effect image, an image 77 having the outline of the construction 75 or having the outline similar thereto on the construction in accordance with the frequency band of music being reproduced. The effect image includes an animation image that is elongated and contracted up and down, for example.

In Example 2, for example, an image of a small-footprint construction 75a (target object image) is assigned to the high-pitch range, an image of a large-footprint construction 75b is assigned to the low-pitch range, and effect images are superposed on the respective images of the constructions.

In addition to the effect image 77, the processing unit 13 may also perform visual effect processing of reducing the visibility of the target object image of the construction 75. Thus, the visibility of the effect image 77 is relatively enhanced.

1.3.3) Example 3

Figure 5:
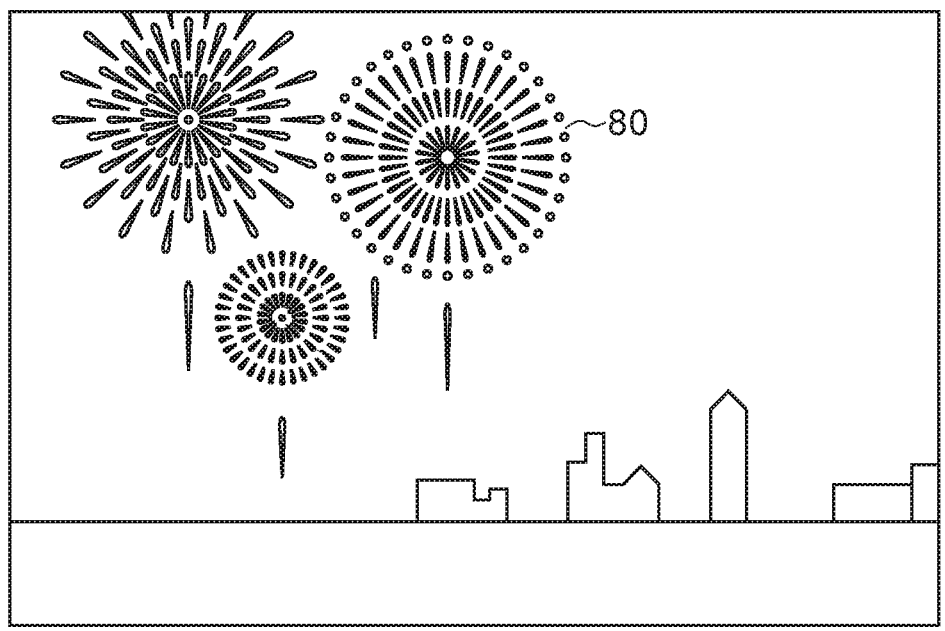
FIG. 5 shows Example 3 of a composite image by visual effect processing in Embodiment 1.

FIG. 5 shows Example 3 of a composite image by the visual effect processing. A real space image according to Example 3 is mainly of a landscape of the night sky. The image recognition unit 11 recognizes the night sky on the basis of the luminance (or brightness), the color, and other conditions of a real space image. The processing unit 13 superposes, as effect images, animations of fireworks 80 having different sizes, on the image of the night sky (target object image) in accordance with the frequency bands of music being reproduced. For example, an effect image of a large firework is generated for a low pitch, and an effect image of a small firework is generated for a high pitch. Moving visual effect processing synchronized with music may also be performed on a target object image of a spectator who is viewing the fireworks 80.

As a result of the recognition of the image recognition unit 11, when the luminance (or brightness) of the sky exceeds a threshold (for example, in the case of a bright sky during daylight), the processing unit 13 may generate an effect image in which the brightness of the sky is reduced, that is, the sky during daylight is changed to the night sky. Then, the processing unit may superpose the effect image of the firework 80 on that night sky. Thus, the user can enjoy the visual effect of the fireworks even in the sky during daylight.

1.3.4) Example 4

Figure 6:
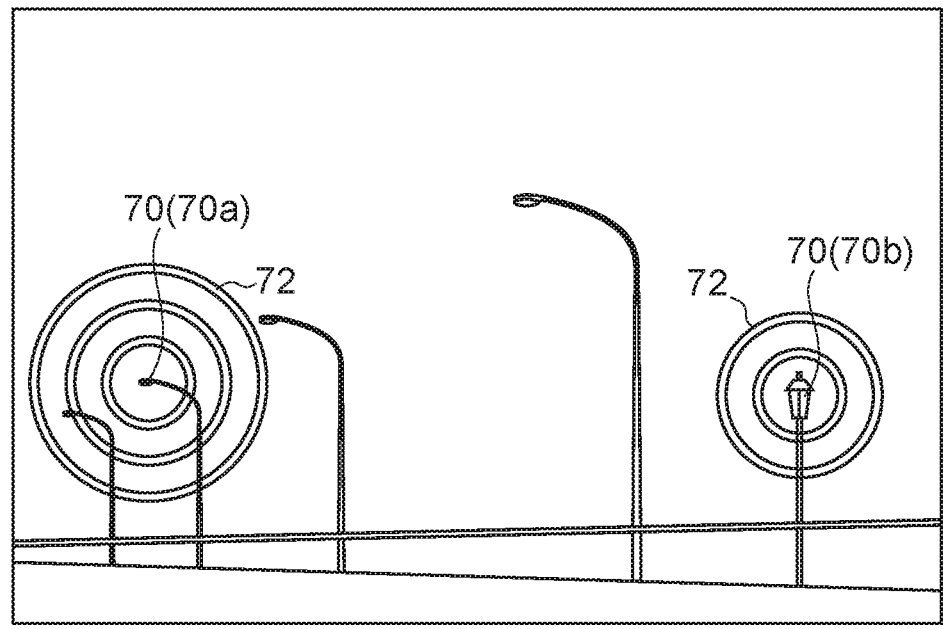
FIG. 6 shows Example 4 of a composite image by visual effect processing in Embodiment 1.

FIG. 6 shows Example 4 of a composite image by the visual effect processing. As in FIG. 3, a real space image according to Example 4 includes an image of a light source 70 as a target object image. The feature amount extraction unit 17 extracts positions of sound sources as a feature amount of music. The processing unit 13 assigns images of light sources 70 (target object images) for each of positions of those sound sources and performs the visual effect processing.

For example, when the music data is stereo data, as shown in FIG. 6, effect images are superposed on light sources 70a and 70b respectively disposed on the left and right sides within a real space image. For example, when music being reproduced is data on the left side only, an effect image (rings 72) is superposed on only the light source 70a on the left side. When the music being reproduced is data on the right side only, an effect image is superposed on only the light source 70b on the right side.

Further, the feature amount extraction unit 17 may extract the signal level for each of the positions of the sound sources, and the processing unit 13 may perform the visual effect processing on the target object images in accordance with those signal levels. For example, the processing unit 13 can change the number of rings 72 in accordance with those signal levels. In this case, the processing unit 13 only needs to generate an effect image in which the number of rings 72 is increased for a lager signal level.

Further, when the music data employs a 5.1-ch surround system, the processing unit 13 assigns more positrons of sound sources within a three-dimensional space including the depth of the real space image. Thus, the visual effect processing synchronized with the music can be performed on the target object image disposed at each position within the three-dimensional space including the depth.

1.3.5) Example 5

The feature amount extraction unit 17 may extract a tempo (speed) as the feature amount of the music. As an example of the real space image including the light sources 70 as shown in FIG. 3, for a slow-tempo song, the processing unit 13 superposes the rings 72 also on the light source 70c with a large area (or high luminance). Meanwhile, for an up-tempo song, the processing unit 13 superposes the rings 72 on the light sources 70 irrespective of the size of the area (or luminance) of the light sources 70.

Alternatively, an effect image of a slow-motion animation may be generated for the slow-tempo song, and an effect image of a quick-motion animation may be generated for the up-tempo song.

2. Embodiment 2

2.1) Configuration of Information Processing Apparatus

Figure 7:
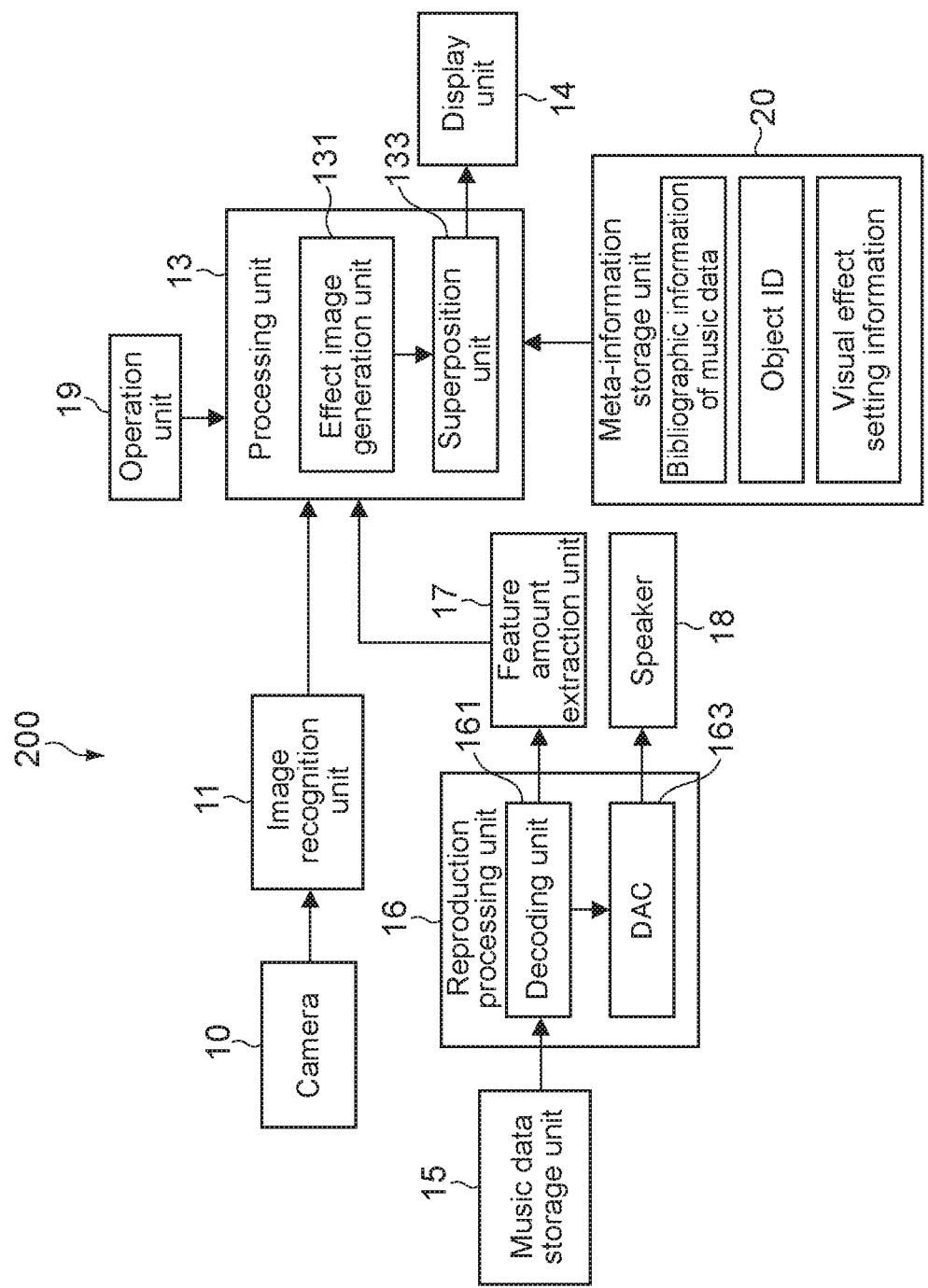
FIG. 7 is a block diagram showing a configuration of an information processing apparatus according to Embodiment 2 of the present technology.

FIG. 7 is a block diagram showing a configuration of an information processing apparatus according to Embodiment 2 of the present technology. In the following description, elements substantially similar to those having functions of the information processing apparatus 100 according to the embodiment shown in FIG. 1 and the like will be denoted by the same reference symbols, description thereof will be simplified or omitted, and differences will be mainly described.

An information processing apparatus 200 according to Embodiment 2 includes a meta-information storage unit 20 that stores meta-information. The meta-information storage unit 20 stores, for example, meta-information attached to music data. Examples of the meta-information attached to music data include bibliographic information such as a title, lyrics, and a singer of a song. Alternatively, examples of the meta-information include an object ID associated in advance with that music data.

Further, the meta-information storage unit 20 can also store, as meta-information, visual effect setting information for setting visual effect processing.

The processing unit 13 is configured to acquire meta-information stored in the meta-information storage unit 20, and perform visual effect processing on the basis of the acquired meta-information.

2.2) Operation of Information Processing Apparatus

Figure 8:
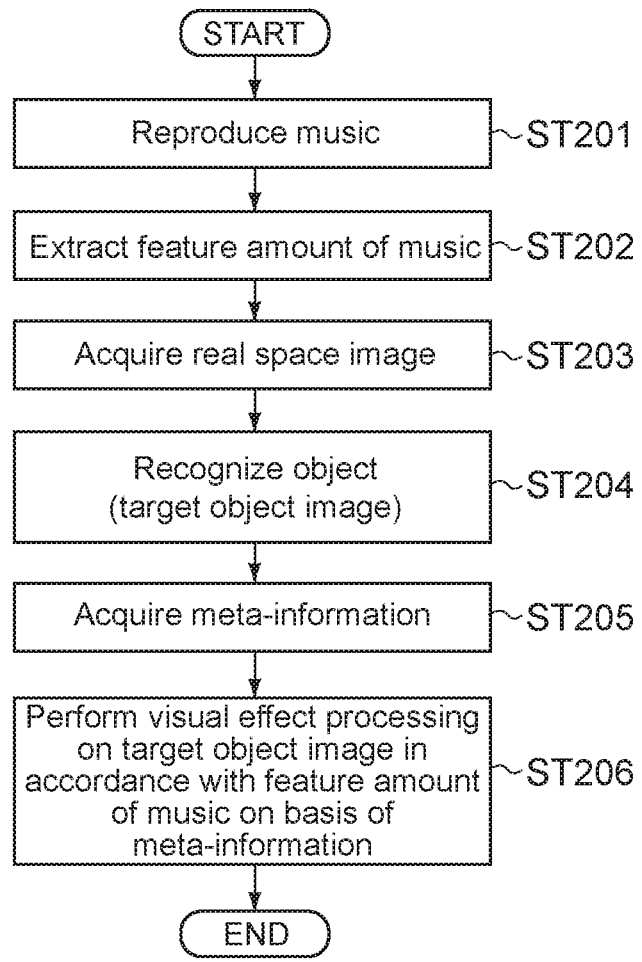
FIG. 8 is a flowchart showing an operation of the information processing apparatus shown in FIG. 7.

FIG. 8 is a flowchart showing an operation of the information processing apparatus 200 according to Embodiment 2. Steps 201 to 204 are the same as Steps 101 to 104 shown in FIG. 2.

The processing unit 13 acquires the meta-information (Step 205). On the basis of the meta-information, the processing unit 13 superposes the effect image on the real space image including the target object image to generate a composite image in accordance with the feature amount of the reproduced music, and displays the composite image (Step 206). Hereinafter, the processing of Step 206 will be described using some examples.

2.2.1) Operation Example 1

It is assumed that the processing unit 13 acquires lyrics or a title as meta-information. The processing unit 13 determines whether words in the lyrics or title include a predetermined keyword or not. If the keyword is included, the processing unit 13 generates an effect image corresponding to that keyword. For example, when a keyword of "flower" is included, an effect image of predetermined flower is generated. The processing unit 13 superposes the effect image of the flower within an arbitrary real space image and displays the effect image.

2.2.2) Operation Example 2

It is assumed that the processing unit 13 acquires lyrics or a title as meta-information as in Processing Example 1 described above, and also acquires an object ID. The processing unit 13 determines whether words in the lyrics or title include a predetermined keyword or not. Further, the processing unit 13 determines whether the type of the object of the target object image recognized by the image recognition unit 11 coincides with the acquired object ID or not. If the keyword is included in the lyrics or title and if the type of the object of the target object image coincides with the object ID, the processing unit 13 generates an effect image corresponding to the keyword. The processing unit 13 then superposes that effect image on a real space image including the target object image and displays the image.

For example, when the keyword is "flower" and when a flower is recognized by the image recognition unit 11 as an object corresponding to the object ID, the processing unit 13 performs visual effect processing related to that flower on the target object image recognized as a flower.

2.2.3) Operation Example 3

The processing unit 13 acquires, in addition to the information related to the music data such as lyrics or a title, meta-information including setting information (visual effect setting information) related to visual effect processing. The visual effect setting information is, for example, information for setting the visual effect processing, such as an intensity of a visual effect (size or area for display), a display speed, a display frequency, and a display color.

For example, as in Operation Example 2, if the keyword is included in the lyrics or title and if the type of the object of the target object image coincides with the object ID, the processing unit 13 performs the visual effect processing according to the visual effect setting information.

The processing unit 13 may acquire, as the visual effect setting information, for example, information indicating an effect image used in each time-series part of a song (how the effect image is). For example, in this case, the visual effect, setting information is information indicating effect images respectively used in the intro section, a first part section, a second part section, and chorus in one song. Alternatively, the visual effect setting information may be information for stopping the visual effect processing depending on the part.

It should be noted that also in Operation Examples 2 and 3, the use of the object ID is not an indispensable element, as described in Embodiment 1.

2.2.4) Other Operation Examples

For example, when the meta-information includes a keyword of "light", the image recognition unit 11 may recognize a light source region within a real space image in accordance with that keyword.

As described above, by using the meta-information, the information processing apparatus 200 can perform diverse visual effect processing based on the meta-information in synchronization with the music.

3. Embodiment 3

Figure 9:
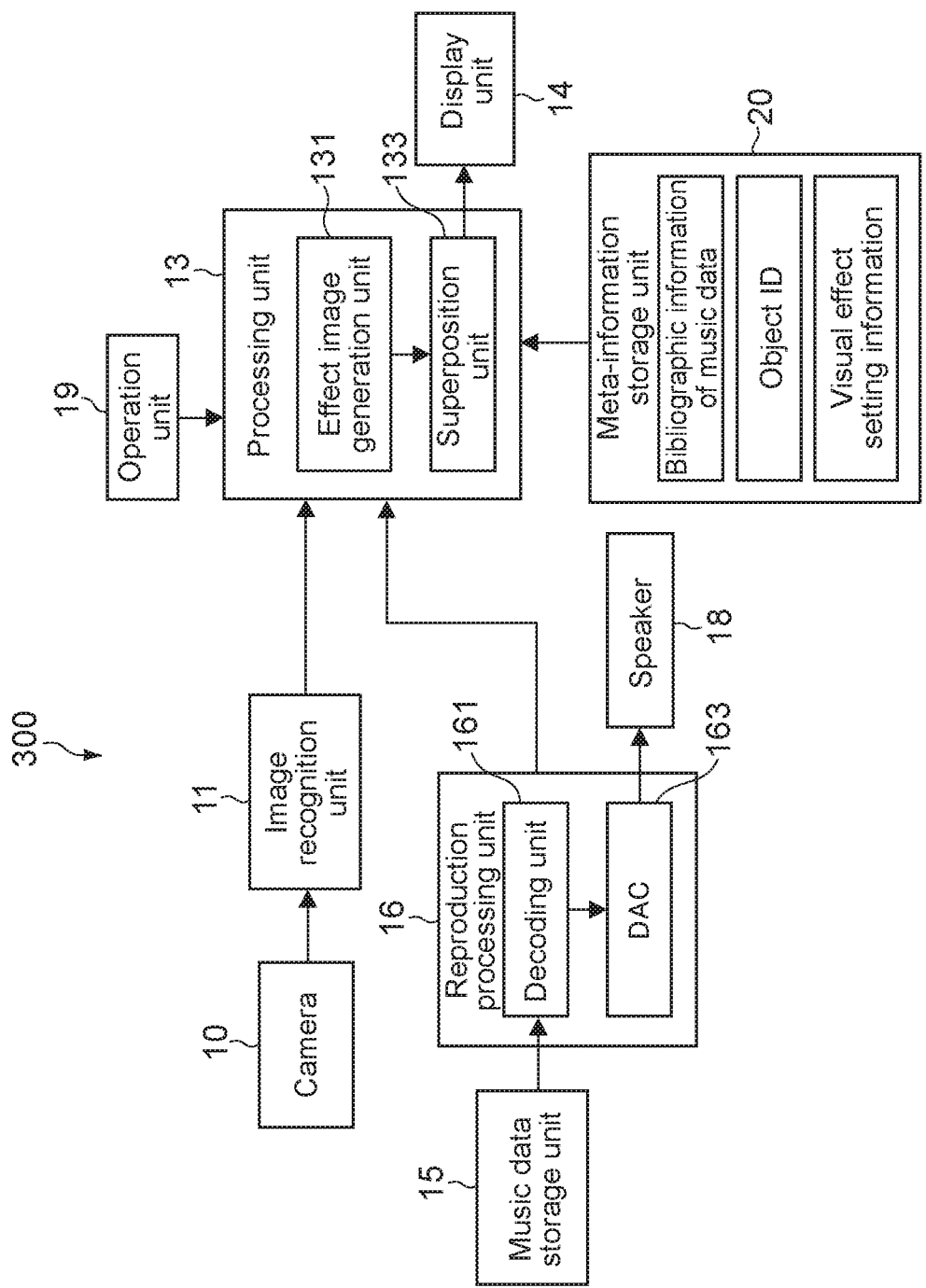
FIG. 9 is a block diagram showing a configuration of an information processing apparatus according to Embodiment 3 of the present technology.

FIG. 9 is a block diagram showing a configuration of an information processing apparatus according to Embodiment 3 of the present technology. The information processing apparatus 300 does not include the feature amount extraction unit 17 (see FIGS. 1 and 7). Further, the information processing apparatus 300 includes the meta-information storage unit 20 as in the information processing apparatus 200 shown in FIG. 7.

Figure 10:
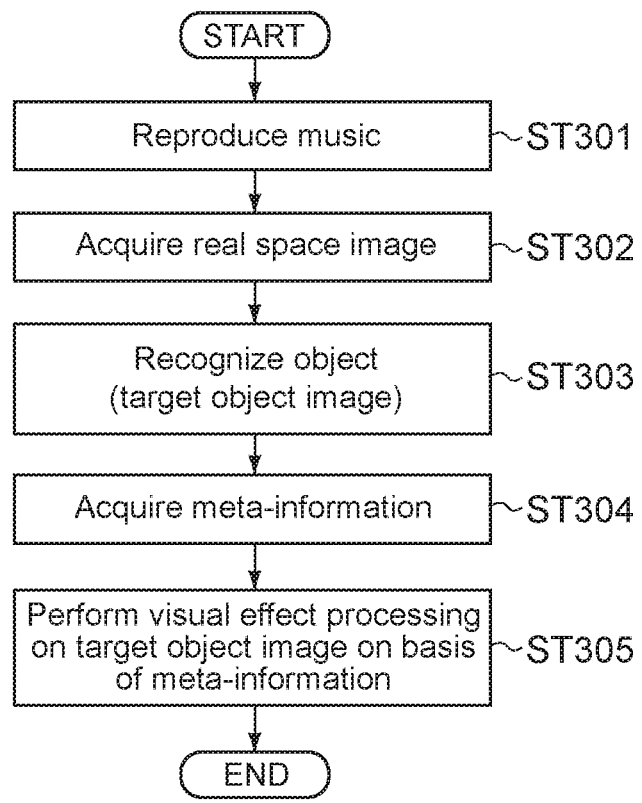
FIG. 10 is a flowchart showing an operation of the information processing apparatus shown in FIG. 9.

FIG. 10 is a flowchart showing an operation of the information processing apparatus 300. Steps 301 to 304 are the same as Steps 201 and 203 to 205 shown in FIG. 2. The processing unit 13 superposes the effect image on the real space image including the target object image to generate a composite image on the basis of the meta-information, and displays the composite image (Step 305). In this case, the processing unit 13 only needs to perform the visual effect processing, for example, during the reproduction of the music or in synchronization with the reproduction volume of the music, irrespective of the feature amount.

4. Embodiment 4

An information processing apparatus according to Embodiment 4 of the present technology, which is not shown in the figures, has, for example, a setting function (setting unit) for a user to input an operation via the operation unit 19 (see FIG. 1 and the like). Examples of setting content include the type of a feature amount of music, an object (object ID), and/or the content of visual effect processing.

For example, the setting unit causes the display unit 14 to display a setting screen (not shown). By the user's input operation via the operation unit 19, the type of a feature amount of music, an object, and/or the content of visual effect processing are/is selected and set. In other words, the type of a feature amount of music, an object, and/or visual effect processing content, which are/is desired by the user, are/is set. The visual effect processing content is, for example, what effect image is to be used, and/or the above-mentioned visual effect setting information.

For example, as a method of selecting an object, when the user taps an image of an object displayed on the touch-panel display unit 14, the object can be selected.

As a method of selecting the visual effect processing content, the user selects, for example, one or more effect images from a plurality of types of effect images corresponding to one object. For example, the same holds true for the above-mentioned visual effect setting information.

In accordance with Embodiment 4, the user can enjoy a visual effect that the user likes. For example, the user can set a moderate effect image with less motion or can set an effect image with strenuous and large motion in accordance with the user's character or preference.

5. Embodiment 5

An information processing apparatus according to Embodiment 5, which is not shown in the figures, further includes a surrounding-environment-information acquisition unit configured to acquire information of a surrounding environment. As Embodiment 5 related to Embodiment 4, the information processing apparatus is configured to, for example, preferentially present one or more visual effect processing content items, which are set on the basis of the information of the surrounding environment, to the user. The user can select that one or more visual effect processing content items via the operation unit 19.

The information of the surrounding environment is, for example, position information of the information processing apparatus, information of natural environment in which the information processing apparatus is placed, or biological information of the user. The position information may include, but not limiting to a two-dimensional position on a map, a three-dimensional position including the altitude and direction information. Examples of the natural environment information include weather, atmospheric pressure, the amount of pollen, and a direction. Examples of the biological information of the user include a body temperature, a blood pressure, a heart rate, and a running speed.

The information processing apparatus according to Embodiment 5 only needs to include a sensor that detects the natural environment information or the biological information of the user. For example, the information of weather, the amount of pollen, or the like may be acquired from a server.

In accordance with Embodiment 5, the user can enjoy an effective visual effect that is suitable for the surrounding environment or the biological information of the user.

6. Various Other Embodiments

The present technology is not limited to the embodiments described above and can achieve various other embodiments. It should be noted that in the following various examples, the use of the feature amount of music is not an indispensable element, as described in Embodiment 3. If the feature amount is not used, the visual effect processing may be executed during the reproduction of the music or in synchronization with the reproduction volume of the music.

6.1) Example 1

The information processing apparatus may acquire user motion information as the surrounding environment described above, and perform the visual effect processing in accordance with that motion information and/or the feature amount. Examples of the user motion information include a heart rate, sweep of arms, and a running speed.

For example, when the heart rate is high, a warm color (for example, red)-based effect image is generated. Conversely, when the heart rate is low, a cool color (for example, blue)-based effect image is generated.

6.2) Example 2

A device to which the information processing apparatus is applied may be not only the above-mentioned smartphone or the like but also a projector. The projector may execute such visual effect processing that performs projection mapping on windows or doors.

6.3) Example 3

At a location where a user has a high tendency to listen to music with the information processing apparatus, visual effect processing set in advance may be executed. Such a location may also be set in advance. In other words, when the user listens to music with the information processing apparatus at a predetermined location, predetermined visual effect processing is executed.

It may be possible to establish a system in which the user can register information of effective visual effect processing content at that location or the user can share the information with other users. Specific examples of such a system include a system in which the user can register (store) information of visual effect processing content in the information processing apparatus or a server in association with a position of a shop on a map. Alternatively, the information of visual effect processing content may be associated with not only the position of the shop on the map but also a target object image of that shop.

6.4) Example 4

For example, the present technology may also be applied to digital signage used for advertisement or the like. In this case, the display unit 14 of the information processing apparatus is a display unit 14 used for digital signage. The processing unit 13 executes visual effect processing based on the music on a real space image that appears on the display unit 14. Music data may be, for example, music provided by an advertiser or a shop or may be music detected with a microphone from the surroundings of the display of the digital signage.

6.5) Example 5

For example, the music may be a singing voice of a user. In this case, the information processing apparatus includes a microphone that detects a singing voice of a user, and a storage unit that stores the singing voice as music data. The storage unit may be in a server on the cloud.

6.6) Example 6

The information processing apparatus may include an analysis unit that analyzes the content of lyrics or the content of a title of the music. The analysis unit is configured to generate the summary of a story or a keyword on the basis of the analysis. For example, when the generated summary or keyword includes "light" and when a real space image includes an image of a light source as the target object image, the processing unit 13 can perform the visual effect processing on the image of the light source.

6.7) Various Other Examples

In the information processing apparatus according to each of the embodiments described above, for example, at least one of the image recognition unit 11, the music data storage unit 15, the decoding unit 161, the feature amount extraction unit 17, the processing unit 13, the meta-information storage unit 20, or the analysis unit described above in 6.6) of Example 6 may be a function of a server on the cloud accessible by the information processing apparatus.

For example, when the above-mentioned server has a function of the feature amount extraction unit 17, the processing unit 13 is configured to download feature amount data of music from the server. In this case, the information processing apparatus 100 transmits identification information for identifying each music data item selected by the user to the server, and the server extracts a feature amount of the music corresponding to the identification information and transmits the feature amount to the information processing apparatus. In this case, the server may have a function of the music data storage unit 15 and may store the music data and the identification information thereof in association with each other.

Alternatively, when the above-mentioned server has a function of the meta-information storage unit 20, the processing unit 13 is configured to download meta-information from the server. In this case, the information processing apparatus transmits identification information for identifying music data selected by the user to the server, and the server transmits meta-information corresponding to the identification information to the information processing apparatus. In this case, the server may have a function of the music data storage unit 15 and may store the music data, the identification information thereof, and the meta-information in association with one another.

In each of the embodiments described above, the processing unit 13 performs the visual effect processing in accordance with one type of the feature amount, but the processing unit 13 may perform the processing in accordance with a plurality of types of the feature amounts. In other words, the processing unit 13 may perform the processing in accordance with a combination of at least two of a frequency band, a position of a sound source, a tempo, and a tone.

The recognition unit (image recognition unit) in each of the embodiments described above is configured to recognize an object within an image in which a real space appears. However, the recognition unit may be configured to measure the real space and recognize an object. For example, in this case, the recognition unit can perform object recognition by using laser, radio waves, and/or ultrasonic waves. Alternatively, the recognition unit may perform both of object recognition by measurement of a real space and object recognition by image recognition.

Of the feature portions of the respective embodiments described above, at least two feature portions can be combined.

It should be noted that the present technology can have the following configurations.

(1) An information processing apparatus, including:
a recognition unit configured to recognize an object in a real space; and
a processing unit configured to perform visual effect processing on a target object image in accordance with a feature amount of music, the target object image being an image of the object recognized by the recognition unit.

(2) The information processing apparatus according to (1), in which
the processing unit is configured to perform visual effect processing associated with a type of the object.

(3) The information processing apparatus according to (1) or (2), in which
the processing unit is configured to acquire a frequency band of the music as the feature amount,
assign a plurality of target object images corresponding to a plurality of objects for each of the frequency bands, and
perform the visual effect processing on the plurality of target object images.

(4) The information processing apparatus according to (1) or (2), in which
the processing unit is configured to
acquire position information of a sound source of the music as the feature amount,
assign a plurality of target object images corresponding to a plurality of objects for each of positions of the sound sources, and
perform the visual effect processing on the plurality of target object images.

(5) The information processing apparatus according to (3) or (4), in which
the processing unit is configured to respectively perform different types of visual effect processing on the plurality of target object images.

(6) The information processing apparatus according to (1) or (2), in which
the processing unit is configured to
acquire information of a tempo of the music as the feature amount, and
perform the visual effect processing in accordance with the tempo.

(7) The information processing apparatus according to (1) or (2), in which
the processing unit is configured to
acquire information of a tone of the music as the feature amount, and
perform the visual effect processing in accordance with the tone.

(8) The information processing apparatus according to any one of (1) to (7), in which
the processing unit is configured to
acquire meta-information attached to data of the music, and
perform the visual effect processing on a basis of the meta-information.

(9) The information processing apparatus according to (8), in which
the meta-information includes visual effect setting information that is information of setting related to the visual effect processing.

(10) The information processing apparatus according to any one of (1) to (9), further including
a feature amount extraction unit that extracts the feature amount from data of the music.

(11) The information processing apparatus according to any one of (1) to (10), further including
a setting unit configured to perform processing of causing a user to set at least one of the feature amount, the object, or content of the visual effect processing.

(12) The information processing apparatus according to any one of (1) to (10), further including
a surrounding-environment-information acquisition unit configured to acquire information of a surrounding environment of the information processing apparatus, in which
the processing unit is configured to further perform the visual effect processing on a basis of the information of the surrounding environment.

(13) The information processing apparatus according to (12), in which
the surrounding environment acquisition unit is configured to acquire, as the information of the surrounding environment, position information of the information processing apparatus, information of a natural environment in which the information processing apparatus is placed, or biological information of a user.

(14) An information processing apparatus, including:
a recognition unit configured to recognize an object in a real space; and
a processing unit configured to perform visual effect processing on a target object image in accordance with meta-information attached to data of music, the target object image being an image of the object recognized by the recognition unit.

(15) An information processing method, including:
recognizing an object is a real space; and
performing visual effect processing on a target object image in accordance with a feature amount of music, the target object image being an image of the recognized object.

(16) An information processing method, including:
recognizing an object is a real space; and
performing visual effect processing on a target object image in accordance with meta-information attached to data of music, the target object image being an image of the recognized object.

(17) A program that causes an information processing apparatus to:
recognize an object in a real space; and
perform visual effect processing on a target object image in accordance with a feature amount of music, the target object image being an image of the recognized object.

(18) A program that causes an information processing apparatus to:
recognize an object in a real space; and
perform visual effect processing on a target object image in accordance with meta-information attached to data of music, the target object image being an image of the recognized object.

REFERENCE SIGNS LIST 10 camera
11 image recognition unit
13 processing unit
14 display unit
15 music data storage unit
16 reproduction processing unit
17 feature amount extraction unit
18 speaker
19 operation unit
20 meta-information storage unit
100, 200, 300 information processing apparatus

The invention claimed is:

1. An information processing apparatus, comprising:
a recognition unit configured to recognize an object in a real space; and
a processing unit configured to
perform visual effect processing on a target object image in accordance with a feature amount of music, the target object image being an image of the object recognized by the recognition unit,
acquire a plurality of frequency bands of the music as the feature amount, and
assign a plurality of target object images corresponding to a plurality of objects for each frequency band of the plurality of frequency bands,
wherein a size of the visual effect processing is set in accordance with the feature amount of the music, and
wherein the recognition unit and the processing unit are each implemented via at least one processor.

2. The information processing apparatus according to claim 1, wherein
the processing unit performs the visual effect processing associated with a type of the object recognized by the recognition unit.

3. The information processing apparatus according to claim 1, wherein
the processing unit is further configured to
perform the visual effect processing on the assigned plurality of target object images.

4. The information processing apparatus according to claim 1, wherein
the processing unit is further configured to
acquire position information of a position of each sound source of the music as the feature amount,
assign the plurality of target object images corresponding to the plurality of objects for the position of each sound source, and
perform the visual effect processing on the assigned plurality of target object images.

5. The information processing apparatus according to claim 3, wherein
the processing unit is further configured to respectively perform different types of visual effect processing on the assigned plurality of target object images.

6. The information processing apparatus according to claim 1, wherein
the processing unit is further configured to
acquire information of a tempo of the music as the feature amount, and
perform the visual effect processing in accordance with the tempo.

7. The information processing apparatus according to claim 1, wherein
the processing unit is further configured to
acquire information of a tone of the music as the feature amount, and
perform the visual effect processing in accordance with the tone.

8. The information processing apparatus according to claim 1, wherein
the processing unit is further configured to
acquire meta-information attached to data of the music, and
perform the visual effect processing on a basis of the meta-information.

9. The information processing apparatus according to claim 8, wherein
the meta-information includes visual effect setting information that is information of setting related to the visual effect processing.

10. The information processing apparatus according to claim 1, further comprising:
a feature amount extraction unit that extracts the feature amount from data of the music,
wherein the feature amount extraction unit is implemented via at least one processor.

11. The information processing apparatus according to claim 1, further comprising:
a setting unit configured to perform processing of causing a user to set at least one of the feature amount, the object, or content of the visual effect processing,
wherein the setting unit is implemented via at least one processor.

12. The information processing apparatus according to claim 1, further comprising:
a surrounding-environment-information acquisition unit configured to acquire information of a surrounding environment of the information processing apparatus,
wherein the processing unit is further configured to perform the visual effect processing on a basis of the information of the surrounding environment acquired by the surrounding-environment-information acquisition unit, and wherein the surrounding-environment-information acquisition unit is implemented via at least one processor.

13. The information processing apparatus according to claim 12, wherein
the surrounding-environment-information acquisition unit acquires, as the information of the surrounding environment, at least one of position information of the information processing apparatus, information of a natural environment in which the information processing apparatus is placed, or biological information of a user.

14. An information processing method, comprising:
recognizing an object in a real space;
performing visual effect processing on a target object image in accordance with a feature amount of music, the target object image being an image of the recognized object;
acquiring a plurality of frequency bands of the music as the feature amount; and
assigning a plurality of target object images corresponding to a plurality of objects for each frequency band of the plurality of frequency bands,
wherein a size of the visual effect processing is set in accordance with the feature amount of the music.

15. A non-transitory computer-readable storage medium having embodied thereon a program, which when executed by an information processing apparatus of a computer causes the information processing apparatus to execute a method, the method comprising:
recognizing an object in a real space;
performing visual effect processing on a target object image in accordance with a feature amount of music, the target object image being an image of the recognized object;
acquiring a plurality of frequency bands of the music as the feature amount; and
assigning a plurality of target object images corresponding to a plurality of objects for each frequency band of the plurality of frequency bands,
wherein a size of the visual effect processing is set in accordance with the feature amount of the music.

16. The information processing apparatus according to claim 4, wherein
the processing unit is further configured to respectively perform different types of visual effect processing on the assigned plurality of target object images.

* * * * *